UNITED STATES PATENT OFFICE.

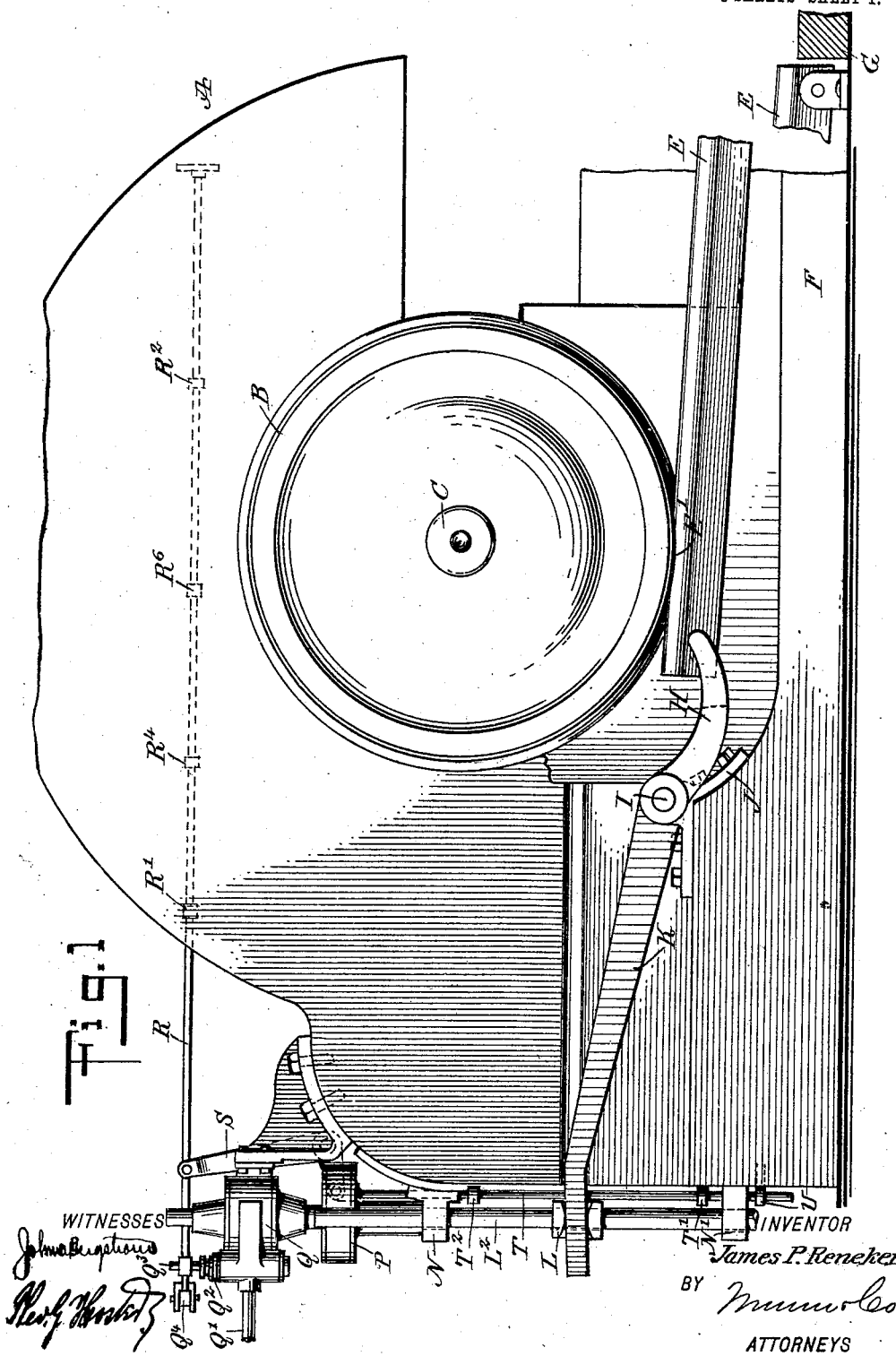

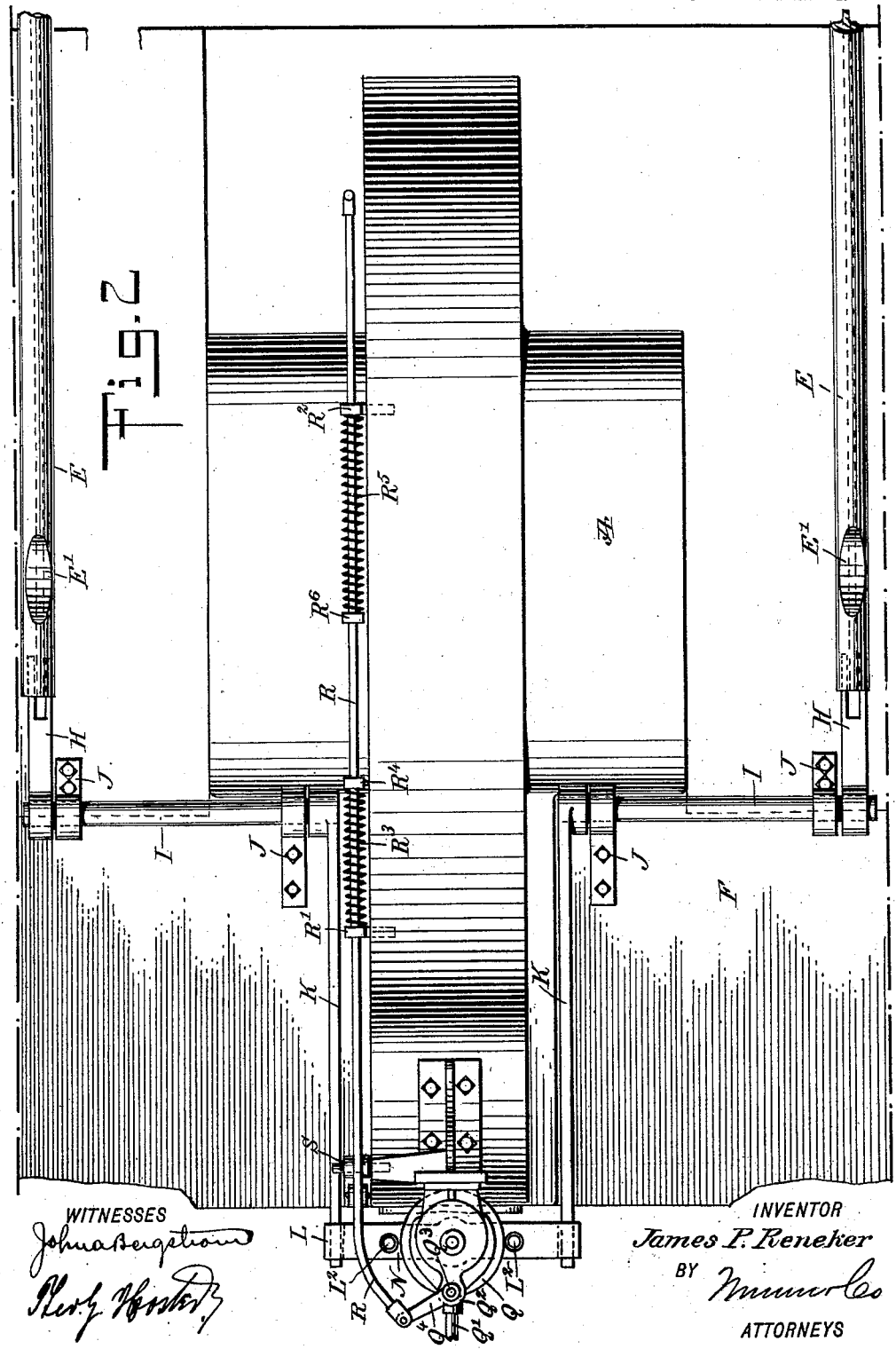

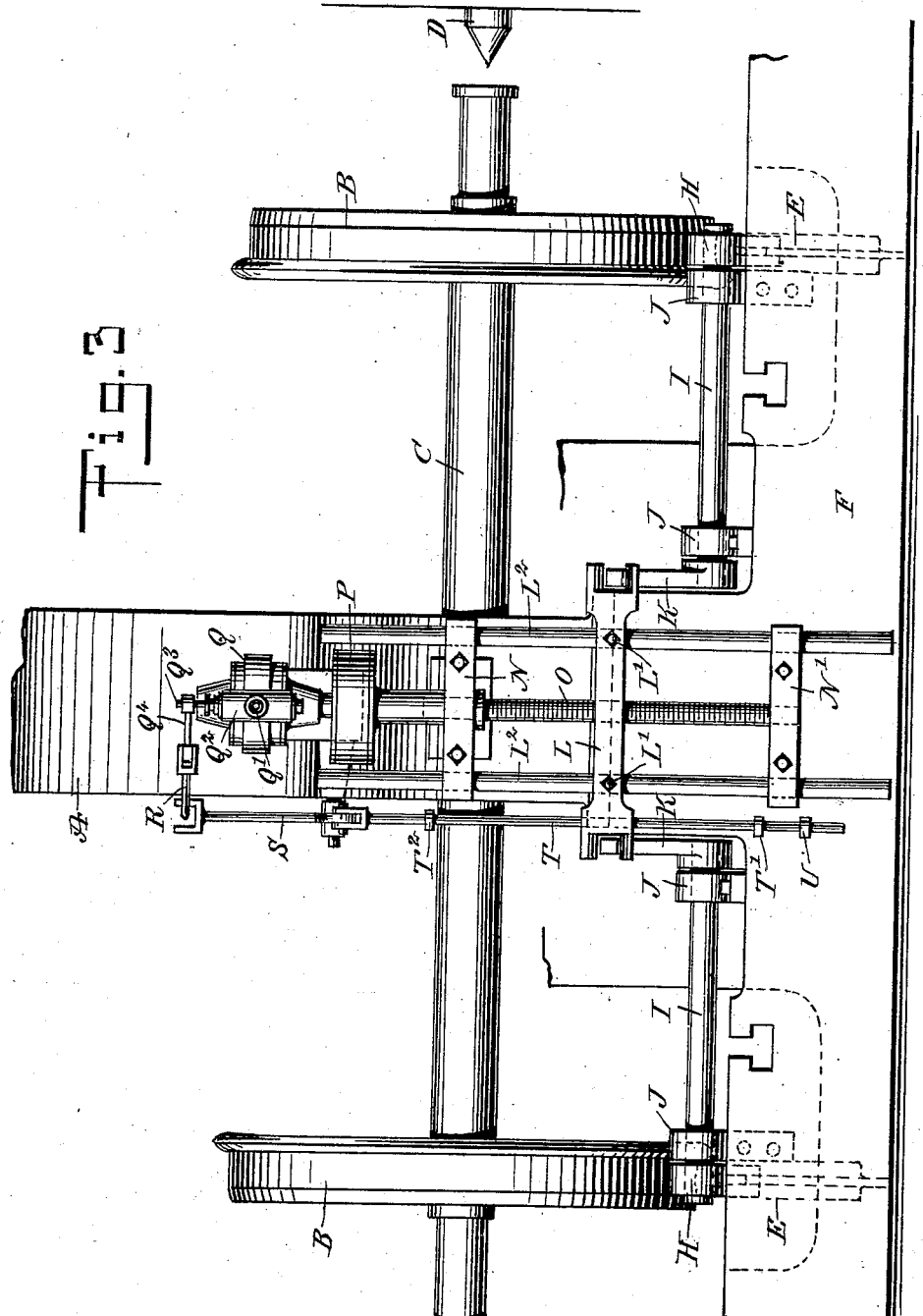

JAMES PILLING RENEKER, OF LOGANSPORT, INDIANA.

LIFTING DEVICE.

No. 915,479.      Specification of Letters Patent.      Patented March 16, 1909.

Application filed August 29, 1908. Serial No. 450,914.

*To all whom it may concern:*

Be it known that I, JAMES P. RENEKER, a citizen of the United States, and a resident of Logansport, in the county of Cass and State of Indiana, have invented a new and Improved Lifting Device, of which the following is a full, clear, and exact description.

The invention relates to lathes for turning a pair of car or locomotive wheels mounted on an axle, and its object is to provide a new and improved lifting device, arranged to permit of conveniently lifting the wheels to bring the axle in axial alinement with the lathe centers, for the latter to engage the axle and allow the same to be rotated for turning the wheels.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied; Fig. 2 is a plan view of the same; and Fig. 3 is an end elevation of the same.

The lathe A for turning a pair of car or locomotive wheels B, B may be of any approved construction, the wheels B, B being mounted on the axle C adapted to be engaged at its ends by the centers D, D of the lathe, to support the axle C and the wheels B, B, and allow of rotating the same during the turning or truing operation.

In order to permit of lifting the wheels B, B and their axle C, to bring the latter into axial alinement with the centers D (see Fig. 3), for the latter to engage the ends of the axle C, the following lifting device is provided: A pair of spaced baseless rails E, E extend across the base F of the lathe A, and at one end onto the floor G, adjacent to the lathe A, so that the wheels B, B can be readily run from the floor onto the rails E, E, which normally extend horizontally, but the floor ends of the rails are preferably pivoted to the floor, as indicated in Fig. 1, to allow swinging of the rails up or down to raise or lower the wheels B, B and their axle C.

The rails E, E are provided at the top near the free ends with recesses or seats E′, for the wheels B to rest in at the time the axis of the axle C is in an approximately vertical plane passing through the axes of the centers D. The free ends of the webs of the rails E, E extend into slots in the free ends of arms H, H, on which rest the heads of the rails E, E, the said arms H, H being attached to shafts I, I, journaled in suitable bearings J secured to the base F of the lathe A.

On the shafts I, I are secured the lever arms K, engaged at their free ends by a cross head L, secured by set screws L′ to vertically extending guide rods $L^2$, mounted to slide in the bearings N, N′ attached to the frame of the lathe A. In the cross head L screws the screw rod O, mounted to turn in the bearings N and N′ and connected at its upper end with a train of reducing gear wheels (not shown) contained in a casing P, the gear wheels being driven by a suitable motor Q supported on the frame of the lathe A. The motor Q is provided with a motive agent supply pipe Q′, in which is arranged a valve $Q^2$, carrying on its valve stem $Q^3$ an arm $Q^4$ connected with a shifter rod R mounted to slide in suitable bearings R′, $R^2$ attached to the frame of the lathe A, as plainly indicated in Fig. 2. A spring $R^3$ is coiled on the shifter rod R and rests with one end on a bearing R′ and abuts with the other end on a collar $R^4$ attached to the shifter rod R. A similar spring $R^5$ is coiled on the shifter rod R and rests with one end on the bearing $R^2$, and at its other end abuts against a collar $R^6$ attached to the shifter rod R. By the action of the springs $R^3$, $R^5$ the shifter rod R is normally held in an inactive position with the valve $Q^2$ closed, but when the shifter rod R is shifted in either direction it is placed under the tension of the spring $R^3$ or $R^5$, according to the direction in which the shifter rod R is shifted. When the shifter rod is released, the spring under tension returns it to normal position and stops the motor.

The lifting device is used as follows: The rails E, E when in their normal horizontal position permit of conveniently running the pair of wheels B, B from the floor G onto the rails E until the wheels finally seat themselves in the recesses or seats E′. The operator now shifts the shifter rod R so as to open the valve $Q^2$ to admit the motive agent to the motor Q, which is thus started, and causes turning of the train of gear wheels in the casing P, and which train of gear wheels causes turning of the screw rod O, so that the cross head L is moved in a downward direction. When this takes place the cross head L imparts swinging motion to the lever arms K, whereby the shafts I are locked and the arms H swing upward, to swing the free ends of the rails E upward, thereby raising the wheels B, B until the axis of the axle C is in axial alinement with the axes of the centers D of the lathe A. The centers D are now run out in the usual manner, so as to engage the axle C at the ends with a view to support the axle and consequently the wheels B, B, to allow of rotating the same for truing their rims by the cutting tools of the lathe A in the usual manner. It is understood that when the rails E have been swung upward by the arms H to bring the axle C into the desired relation with the centers D, then the motor Q is stopped by the operator returning the shifter rod R to normal position, and after the axle C is supported on the centers D then the shifter rod R is moved by the operator in the opposite direction, to cause the motor Q to run in a reverse direction, thereby moving the cross head L upward and reversing the motion of the arms K, shaft I and arms H, to swing the rails E downward out of engagement with the wheels B. The shifter rod R is then returned to normal position to stop the motor Q. After the wheels B have been trued, the shifter rod R is again shifted, to start the motor Q in a forward direction, with a view to move the cross head L downward, so as to swing the rails E upward back into engagement with the wheels B, after which the motor Q is stopped and the centers D are run out of engagement with the axle C, and then the motor is again started in a reverse direction, to swing the rails E downward to normal horizontal position, after which the motor is again stopped and the wheels B are run off the rails E.

In order to permit automatic control of the stopping of the motor Q in either direction, the following arrangement is made: A bell crank lever S, fulcrumed on the frame of the lathe A, is pivotally connected with the shifter rod R and with a trip rod T, mounted to slide vertically in a suitable bearing U, attached to the lathe A, and on the said trip rod T are secured collars $T'$, $T^2$ adapted to be engaged by the cross head L when the latter moves into a lowermost position or into an uppermost position. Thus when the rails E are swung upward to bring the axle C into proper relation with the centers D, then the cross head L engages the collar $T'$, thus moving the trip rod T downward and thereby imparting a swinging motion to the bell crank lever S, which shifts the shifter rod R to close the valve $Q^2$ and stop the motor Q without the aid of the operator. In a like manner when the cross head L moves upward when lowering the rails E, the cross head L engages the collar $T^2$ and moves the trip rod T upward, thus imparting a reverse swinging motion to the bell crank lever S, to remove the shifter rod R into closing position and with it the valve $Q^2$, to stop the reverse motion of the motor Q.

Having thus described my invention, I claim as new and desire to secure by Letters Patent:

1. A lifting device for a pair of wheels and axle, comprising rails for the wheels to run on, shafts carrying arms engaging the rails at one end to impart a swinging motion to the same, and means for rocking said shafts in unison.

2. A lifting device for a pair of wheels and axle, comprising rails for the wheels to run on, and having seats for the wheels to rest in, shafts carrying arms engaging the rails at one end to impart a swinging motion to the same, and means for rocking the said shafts in unison.

3. A lifting device for a pair of wheels and axle, comprising swing rails for the wheels to run on, a shaft carrying lifting arms engaging the free ends of the said rails for imparting a swinging motion to the rails, a cross head mounted to slide vertically, lever arms on the said shaft and engaging the said cross head, and means for raising or lowering the said cross head.

4. A lifting device for a pair of wheels and axle, comprising swing rails for the wheels to run on, a shaft carrying lifting arms engaging the free ends of the said rails for imparting a swinging motion to the rails, a cross head mounted to slide vertically, lever arms on the said shaft and engaging the said cross head, a screw rod screwing in the said cross head, and means for turning the said screw rod.

5. A lifting device for a pair of wheels and axle, comprising swing rails for the wheels to run on, a shaft carrying lifting arms engaging the free ends of the said rails for imparting a swinging motion to the rails, a cross head mounted to slide vertically, lever arms on the said shaft and engaging the said cross head, a screw rod screwing in the said cross head, a motor for turning the said screw rod, and automatic means controlled by the said cross head for stopping the said motor.

In testimony whereof I have signed my name to this specification in the presence of two subscribing witnesses.

JAMES PILLING RENEKER.

Witnesses:
 HERMAN RITTER,
 HENRY C. KLEIN, Sr.